United States Patent

[11] 3,596,144

| | | |
|---|---|---|
| [72] | Inventor | George J. Cunningham |
| | | Columbus, Ohio |
| [21] | Appl No. | 782,504 |
| [22] | Filed | Oct. 31, 1968 |
| [45] | Patented | July 27, 1971 |
| [73] | Assignee | F. W. Bell, Inc. |
| | | Columbus, Ohio |

[54] AUTOMATIC MAGNET CHARGER AND CALIBRATION SYSTEM
13 Claims, 4 Drawing Figs.

[52] U.S. Cl..................................................... 317/123,
317/157.5
[51] Int. Cl.................................................... H01f 13/00
[50] Field of Search........................................ 317/123,
157.5; 324/42

[56] References Cited
UNITED STATES PATENTS
| | | | |
|---|---|---|---|
| 3,235,776 | 2/1966 | Ireland.......................... | 317/157.5 |
| 3,418,542 | 12/1968 | Renner.......................... | 317/157.5 |
| 3,303,398 | 2/1967 | Barta et al..................... | 317/157.5 |
| 3,274,452 | 9/1966 | Landes........................... | 317/157.5 |
| 3,479,584 | 11/1969 | Casey............................ | 324/28 |
| 3,242,386 | 3/1966 | Avery et al................... | 317/123 |

Primary Examiner—Lee T. Hix
Assistant Examiner—C. L. Yates
Attorney—Anthony D. Cennamo ABSTRACT: The invention is for an automatic magnet charger and calibration system utilizing a magnet charger to saturate the magnetic materials, an AC demagnetizing unit to stabilize the magnets, and a Hall effect gaussmeter to continuously monitor the DC component of magnetism in the presence of the large AC pull-back signal. Reference is made to the claims for a legal definition of the invention.

INVENTOR.
GEORGE J. CUNNINGHAM
ATTORNEY

INVENTOR.
GEORGE J. CUNNINGHAM

*INVENTOR.*
GEORGE J. CUNNINGHAM
BY
ATTORNEY

AUTOMATIC MAGNET CHARGER AND CALIBRATION SYSTEM

BACKGROUND

Many applications employing magnets do not require magnets which have met precise specifications or whose magnetic properties are uniform. Variations of 10 to 40 percent may be unimportant in some noncritical applications such as for holding or separator magnets.

However, more careful process control is needed in many magnet applications. The normal variations in magnetic properties result in wide deviations in flux density from magnet to magnet in the same production run, even when all magnets are subjected to the same charging and stabilizing influence. Stabilization of a magnet has been defined as magnetic or temperature stabilization. The present invention is concerned only with magnetic stabilization.

The ability to reduce the variation from the desired standard to 1 percent may be extremely valuable and critically important in some transducer or instrument applications. Other examples of where reproducibility of magnets with flux densities within the required limits is essential are beam focusing magnets, magnetic resonance and microwave devices, permanent magnet motors, and temperature controllers where the value of flux density affects calibration, accuracy, or efficiency of operation. This reproducibility is currently being achieved manually by the combined use of a variac and a capacitor discharge system. Once the magnetic material has been taken to saturation, it is, presently, brought back to stabilization by the use of a capacitor discharge system, which makes repeatable results difficult.

Under the prior art the remanent magnetism could only be measured at the end of the capacitor discharge. Therefore, no adjustment could be made during the demagnetization step to compensate for material variations. This meant that the demagnetization, which could not be continuously monitored, was accomplished in small, individual, time-consuming steps.

In the past it has, therefore, been necessary to use skilled labor and inefficient, uneconomical means to achieve the desired results.

SUMMARY OF THE INVENTION

The invention relates to a system for automatically producing uniformly accurate stabilized magnets. The system consists of four basic units. The first of these is a magnet charger which, by the use of capacitor discharge means, brings the field strength of the magnetic material to saturation. The second unit is a means for applying an AC force to the magnetic material to demagnetize the material and drive the material to a predetermined lower flux density. This demagnetization step stabilizes the magnet. The degree of demagnetization necessary to bring the magnet to the desired stabilized level is measured continuously by a Hall effect gaussmeter, the third basic unit. The meter has a suppression circuit enabling it to measure only the strength of the permanent magnet sample's field without being influenced by the demagnetizing field produced in the coil by the stabilizer. The fourth basic unit is a system control unit which permits the automatic or semiautomatic system modes of operation of the first three units.

The present invention solves several problems previously existent in the prior art. The desired uniformity between produced magnets, in spite of material variations, is achieved in the present invention through the combined use of an AC demagnetization unit and a Hall effect gaussmeter which measures the flux density in the magnet material at all times. The system can be calibrated against a known standard or to a specific value of flux density and can reproduce this value by automatically adjusting for material variations. The system will produce a calibrated stabilized magnet in approximately 5 seconds which is an efficient production rate. Skilled labor is not required for the operation of the system. For a given instrument setting the system produces magnets whose magnetic strength will be within 0.1 percent of the strength of any other. Parts which do not reach saturation or are not within set limits about the desired stabilization level may be automatically rejected by the invention.

OBJECTS

Accordingly it is a principal object of the invention to provide an improved means for producing stabilized magnets.

Another object of the invention is to provide a system for automatically producing stabilized magnets.

Another object of the invention is to provide a system for producing stabilized magnets which permits reproducibility of 0.1 percent between magnets for a given setting of the system.

Another object of the invention is to provide a system which can efficiently and economically produce stabilized magnets.

A further object of the invention is to provide a system which will reject parts unsuitable for producing a stabilized magnet of a given value.

Still a further object of the invention is to provide a system for producing stabilized magnets which has the reliability afforded by solid state devices.

For a complete understanding of the invention, together with other objects and advantages thereof, reference may be made to the accompany drawings, in which:

DETAILED DESCRIPTION OF THE DRAWINGS

The production of uniformly accurate and stable magnetic fields involves three basic steps. The first is to magnetize the part to saturation by application of a large single unidirectional magnetizing impulse. Next an AC demagnetizing force is applied to drive the magnet to a predetermined lower flux density and thus to stabilize and calibrate the magnet. The last step is to measure the reduced final flux density value to verify that it falls within the desired limits of accuracy.

Figure 1:
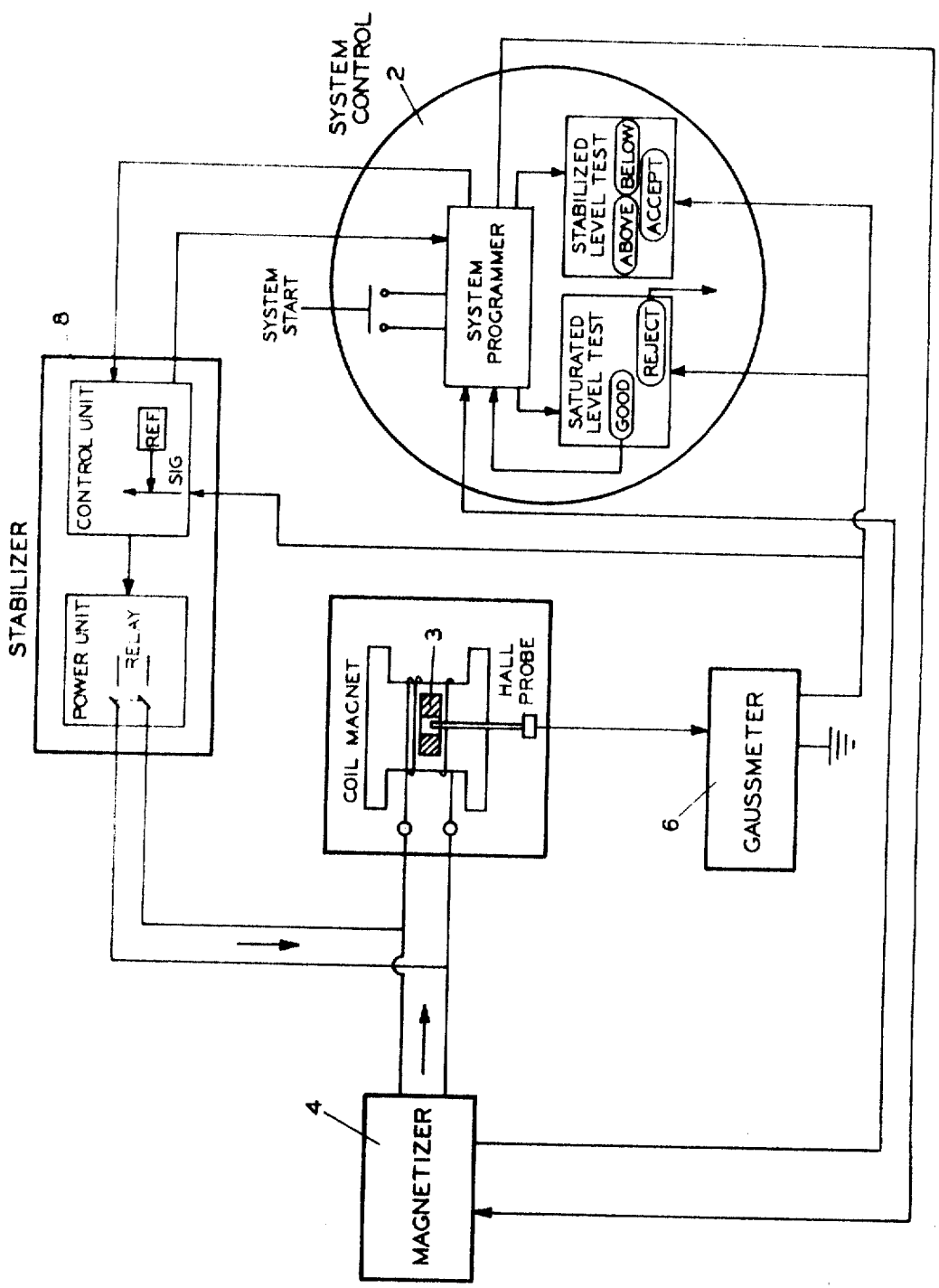
FIG. 1 is a block diagram representation of the automatic magnet charger and calibration system.
Figure 2:
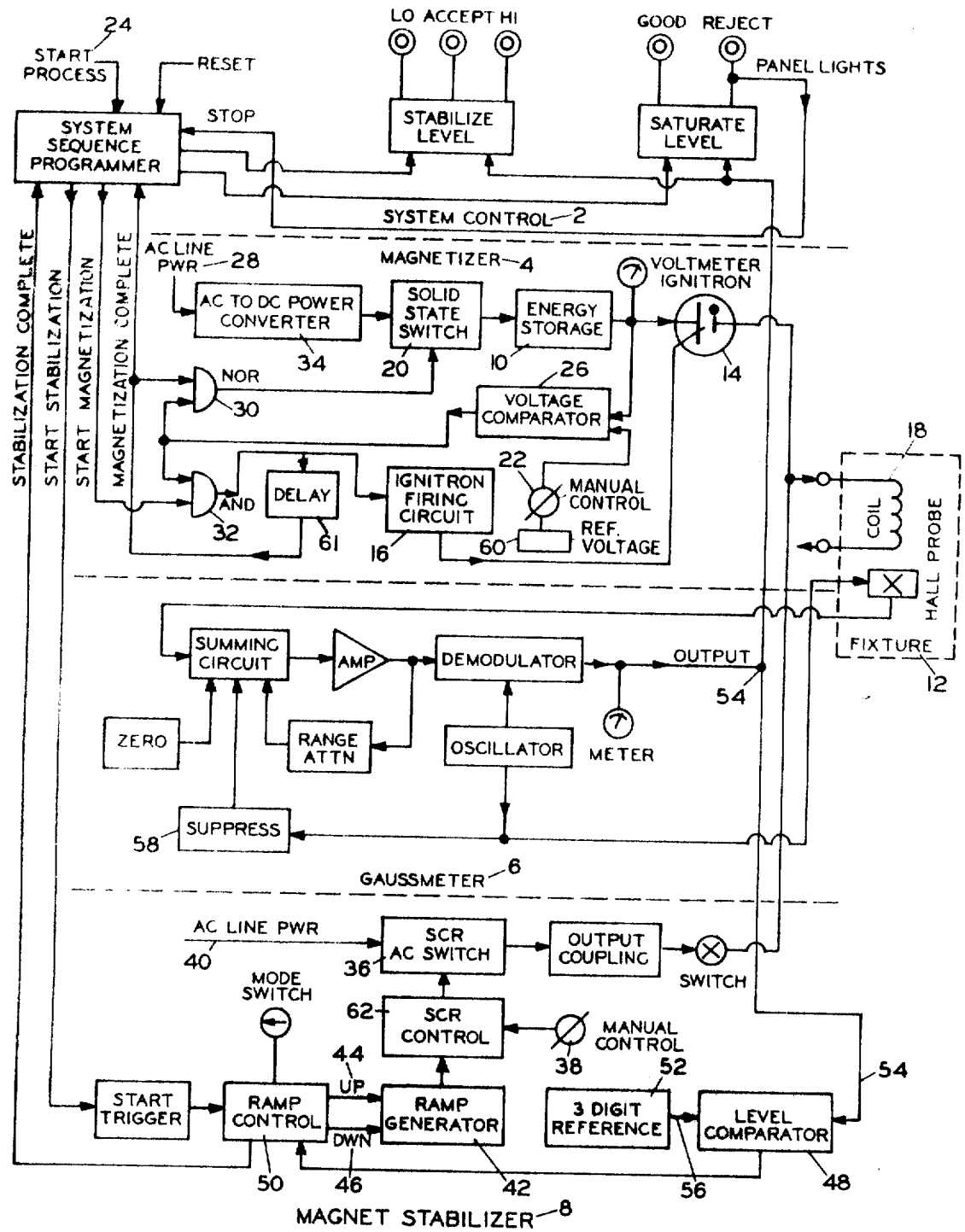
FIG. 2 is a block diagram representation showing in detail the composition and interconnection of the basic units of the preferred embodiment illustrated in FIG. 1.

The system disclosed herein performs these steps automatically. A block diagram representation of the system is illustrated in FIGS. 1 and 2. FIG. 1 illustrates the basic units and FIG. 2 shows these units in more detail. The system comprises four basic units which function together to produce the desired results. These units are the system control 2, the magnetizer 4, the gaussmeter 6, and the magnet stabilizer 8.

Referring now to FIG. 1, the interaction between the four basic units is illustrated. The system control 2 actuates the magnetizer 4. When magnetization is complete the magnetizer 4 signals the system control 2, which tests the magnet 3 to determine if the saturated flux density is above a preset minimum value. This test is accomplished by utilizing the measurement made by the gaussmeter 6. Assuming the saturated flux density of the magnet is above the present minimum the system control 2 activates the stabilizer unit 8 which applies an AC force to the magnet 3 driving it to any desired lower flux density. The value of the flux density in the magnet 3 is constantly measured by the gaussmeter 6 and the final flux density is checked by the system control 2 to assure that it is within the desired limits.

A more detailed description of the system's operation, utilizing FIG. 2, now follows. The magnetizer 4 is an impulse type magnet charger using the discharge of energy storing capacitors 10, into the charging fixture coil 18. An ignitron 14, fired from a logic controlled firing circuit 16, acts as a switch to close the discharge circuit. The resulting high current pulse in the coils 18 charges the magnet to saturation. Circuitry is solid state and no relays are used in order to obtain maximum reliability.

The voltage control circuit of the magnetizer 4 applies charging current to the energy storage capacitors 10, via the solid state switch 20, only for the period of time necessary to bring the voltage up to the value established by the front panel manual control 22 setting. Thus the storage units 10 are "floating" ready for discharge whenever the start button 24 is depressed. If the voltage drops below the set value, the comparator 26 operates to compare the voltage on the energy storage capacitors 10 against the reference voltage supply 60 as adjusted manually by control 22. Comparator 26 output is a digital type output voltage, +V if the capacitor voltage exceeds the reference, and O if the capacitor voltage is less than the reference.

A combination of below normal voltage on capacitors 10 and "magnetization complete" will cause switch 20 to apply charging current to the capacitors. A combination of above normal (or at normal) voltage on capacitors 10 and a start magnetization signal will initiate magnetization thru ignition 16. The switch 20 is opened by the logic gate 30 during magnet charging to isolate the fixture 12 from the power source 28. Normally, the fixture 12 is also isolated by the ignitron 14, except during a charge impulse, which is an added safety feature. An additional logic gate 32 in the start circuit makes it impossible to initiate an energy pulse until the voltage on the storage capacitors 10 has come up to proper level.

In producing magnets on a production run basis, an important consideration is the recycle time. This is the time required after one charge pulse to recharge the storage units for the next charge pulse. Unless this time is short, it may limit the turnover rate and production output of the charger. Recycle time is normally limited by the charging of the capacitors which follows an exponential charge curve, rising rapidly at first and then tapering off slowly to its final value. The slow-tapering rise to full charge has been modified in the invention by the design of the power converter 34, which provides essentially a linear charge curve. The capacitor charge curve is, therefore, modified by the invention by the use of a constant current source up to approximately two-thirds of the total maximum voltage. After that point the standard capacitor charge curve applies. By operating the magnetizer at maximum linear charge rate, independently of the level required, the magnetizer in many applications can recycle once every 1½ to 2 seconds. The total system recycle time is less than 5 seconds in most applications. Line voltage errors in a production or shop environment, are eliminated by the magnetizer's voltage control circuit. An output pulse is provided by the magnetizer to indicate when the saturation of the magnet is completed. This pulse is used to initiate the stabilization cycle.

The stabilization step is necessary to reduce the effect of an external magnetic field causing permanent change in the final magnetic level of the stabilized magnet. This is due to the fact that after the magnet has been stabilized it would take a substantially larger external force to effect the magnet's stabilization point. The use of the AC demagnetization force produces a magnet whose final stabilization point is solid without internal drifting. The repeatability and standardization of the stabilized magnets produced with the invention is of great importance in the areas of production and application.

Figure 3:
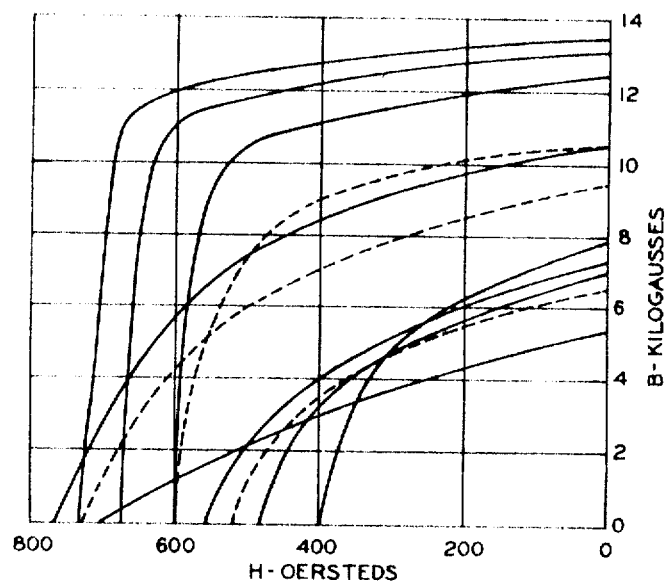
FIG. 3 is a graphical representation of the second quadrant typical magnetic hysteresis curves for various magnetic materials.

The B-H characteristics of permanent magnet materials, see FIG. 3, requires that they be first charged to saturation and then pulled back to final value by demagnetization.

As a demagnetizing field is applied to a saturated magnet, the induction will decrease along the major hysteresis loop in the second quadrant. If when the induction reaches point C of FIG. 4 the demagnetizing field is reduced the induction will generally not retrace the major loop but will follow a new path $CD_1$. Alternately varying the demagnetizing field at some intermediate strength will cause the induction to trace a small interior loop such as $DD_1$. An infinite number of these loops may be traced depending upon the magnitude of the varying demagnetizing field. These interior hysteresis loops are termed minor loops.

Figure 4:
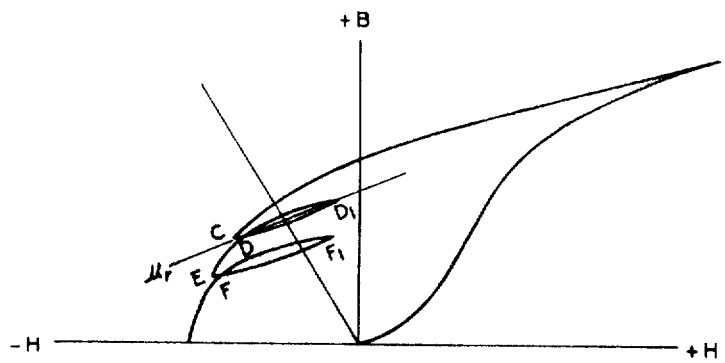
FIG. 4 is a graphical representation of the first and second quadrants of a typical hysteresis curve showing the effect of the AC demagnetization field on the stabilization of the magnet.

Referring now to FIG. 4, the use of alternating current is highly desirable for stabilization because it results in a sinusoidal sweep of the entire minor hysteresis loop. The negative sweep being sufficient to slightly demagnetize the part. This is a very sensitive and difficult adjustment to make manually because the amount of pullback or field reduction is not only a nonlinear function of the applied field strength, but is different in magnitude for each magnet. Automating the process is the only way to obtain consistent and accurately repeatable results.

Demagnetization must be applied gradually while simultaneously monitoring the static field value. If pullback is applied too rapidly, overshoot may result and the entire process must be repeated. The rate of approach to final value is also influenced by the desired final accuracy and the system response time. The response time of the gaussmeter is a limiting factor which determines the slope of the envelope of the AC demagnetizing voltage. The residual static flux in the magnet drops as the applied AC pullback excitation is increased. Having reached the present final value and allowing several sweeps of the minor hysteresis loop about this value, it is important that the AC demagnetization field be reduced to zero at a rate slow enough to assure a symmetrically shrinking minor hysteresis loop. When this is done the final field of the permanent magnet will agree with the static component measured during the pullback program. This is due to the fact that if the magnet is not left at its final operating point but rather somewhere on the minor hysteresis loop it will, in time, internally drift back to its final operating point.

An accuracy requirements become more stringent, the process requirements become more critical and more difficult to carry out manually. Standardization and automation of the process cycle is then necessary for a uniform product and the most economical operation.

The magnet stabilizer unit 8 is designed with these process requirements in mind. Referring to the block diagram of FIG. 2, a solid state switch 36 is used as a full wave AC switch to control power fed to the fixture coils 18. Coil inductance smooths the wave form adequately for good pullback. A manual control 38 allows the AC power 40 to be gradually increased for pullback and then tapered off after the desired level is obtained. For automatic programming, ramp generators 42 generate a linear voltage up-ramp or down-ramp which is used to vary the SCR firing angle by means of the SCR control 62 thus varying the AC output current to the fixture coil 18. Well known conventional resistance-capacitance circuits are used to generate the voltage ramps including transistor constant-current circuits to obtain linear capacitor charging characteristics. Ramp control 50 simply switches in the correct ramp capacitors to obtain up or down ramp of the desired rate. Ramp rates are separately controllable 44 and 46, and ramp cutoff levels are determined by the level comparator 48. When the desired level is reached the comparator 48 instructs the ramp logic 50 to stop the up ramp and initiate the down ramp. The reference for the comparator 48 is in the form of a 3-digit calibrated control 52 which can be used to set in the desired final flux density. The comparator 48 then indicates agreement between gaussmeter output 54 and reference output 56. When the stabilizer 8 is used without a gaussmeter, in the automatic repeat cycle mode, an adjustment is provided for setting the maximum pullback field level applied to the magnet. The maximum pullback field level is set to be greater than any expected demagnetizing force the magnet may be exposed to in actual operation.

The stabilizer unit 8 can be adjusted to carry out the optimum stabilization cycle for a particular type and size of magnet and to automatically repeat the program with a very high repeatability and accuracy.

When the stabilizer unit 8 is integrated into the system shown in FIG. 2, where the gaussmeter 6 monitors continually the magnetic field during the pullback cycle, the stabilizer unit 8 automatically readjusts the cycle so that all magnets are stabilized to the same final flux density value. In this way the variations in magnetic properties of individual magnets are compensated. This is a necessary feature in many precise applications because of unavoidable variations in alloy, crystal structure, heat treat, and dimensional tolerances encountered in production magnets. The stabilizer unit's solid state circuitry eliminates relays to improve the system's reliability.

The gaussmeter unit 6 of the system is used to continuously measure the magnetic flux density of the magnet in the test fixture 12. The gaussmeter 6 uses a flux modulated carrier current system and all solid state circuitry. It has high stability when measuring steady magnetic fields from permanent magnets while at the same time rejecting the alternating or pulsating fields which occur in the processing cycle.

The unit 6 is capable of rejecting AC fields approximately one hundred times greater than the DC field due to an AC suppression circuit 58. The suppression circuit is a highly selective frequency filter circuit adjusted to reject the AC line frequency signal and its harmonics. Well known filter circuit techniques are used to accomplish this rejection. This allows closer control and reduces cycle time.

The unit 6 provides a flux-proportional output voltage, calibrated to flux density, which is used to control the stabilization pullback process and thus to "zero in" on the final desired value. It thus closes the process feedback control loop.

Although a certain and specific embodiment has been illustrated, it is to be understood that modifications may be made without departing from the true spirit and scope of the invention.

What I claim is:

1. An automatic magnet charger and calibration system, the improvement comprising: impulse magnetizing means to saturate said magnet, means to continuously measure the amount of magnetic flux density in said magnet, means to demagnetize said magnet to a predetermined stabilized magnetic flux density, and automatic control means connected to said demagnetizing means and to said continuous measuring means for deactivating said demagnetization means when said predetermined magnetic flux density is obtained.

2. An automatic magnet charger and calibration system as set forth in claim 1 wherein said impulse magnetizing means to saturate said magnet includes a source of energy, means for storing said energy, a charging fixture coil, switching means for electrically isolating said energy storage means from said fixture coil until energy sufficient to saturate said magnet has been stored in said storage means, and means controlling the switching means and signalling the discharge of said stored energy.

3. An automatic magnet charger and calibration system as set forth in claim 2 wherein said source of energy comprises means to convert AC power to DC power in a controlled manner.

4. An automatic magnet charger and calibration system as set forth in claim 2 wherein said means for storing said energy comprises capacitors.

5. An automatic magnet charger and calibration system as set forth in claim 1 wherein said magnetizing means further comprises means to electrically isolate said source of energy from said means for storing said energy, and means for electrically isolating said energy storage means from said fixture coil until energy sufficient to saturate said magnet has been stored in said storage means.

6. An automatic magnet charger and calibration system as set forth in claim 2 wherein said magnetizing means further comprises means to provide a signal to said automatic control means from said means controlling said switching means when said magnet has reached saturation.

7. An automatic magnet charger and calibration system as set forth in claim 1 wherein said means to demagnetize said magnet to said predetermined stabilized magnetic flux density further comprises an alternating current source of power.

8. An automatic magnet charger and calibration system as set forth in claim 7 wherein said demagnetization means further comprises means to control the amount of said AC power utilized to demagnetize said magnet.

9. An automatic magnet charger and calibration system as set forth in claim 1 wherein said means to automatically control and interrelate said first three mentioned means comprises said first mentioned means magnetizing said magnet to saturation, said control means utilizing said magnetic flux density measuring means to confirm that saturation has been attained, said control means activating said demagnetization means, said measuring means continuously indicating to said control means the amount of magnetic flux density in said magnet, said control means deactivating said demagnetization means when said predetermined stabilized magnetic flux density is obtained.

10. An automatic magnet charger and calibration system, the improvement comprising: impulse magnetizing means to saturate said magnet, means to continuously measure the amount of magnet flux density in said magnet, said measuring means comprising a Hall effect gaussmeter, means to demagnetize said magnet to a predetermined stabilized magnetic flux density, and automatic control means connected to said demagnetizing means and to said continuous measuring means for deactivating said demagnetization means when said predetermined magnetic flux density is obtained.

11. An automatic magnet charger and calibration system as set forth in claim 10 wherein said gaussmeter further comprises means to suppress AC fields approximately two orders of magnitude greater than the DC field of said magnet.

12. An automatic magnet charger and calibration system as set forth in claim 10 wherein said gaussmeter further comprises means to provide a signal to said automatic control means indicating the demagnetization of said magnet, said signal comprising a flux-proportional output voltage which is calibrated to said flux density in said magnet.

13. An automatic magnet charger and calibration system as set forth in claim 10 wherein said means to automatically control and interrelate said first three mentioned means comprises said first mentioned means magnetizing said magr et to saturation, said control means utilizing said magnetic flux density measuring means to confirm that saturation has been attained, said control means activating said demagnetization means, said measuring means continuously indicating to said control means the amount of magnetic flux density in said magnet, said control means deactivating said demagnetization means when said predetermined stabilized magnetic flux density is obtained.